United States Patent [19]

Röhm

[11] Patent Number: 4,738,187
[45] Date of Patent: Apr. 19, 1988

[54] SELF-LUBRICATING HYDRAULIC ACTUATOR FOR POWER CHUCK

[76] Inventor: Günter H. Röhm, Heinrich-Röhm-Str. 50, D-7927 Sontheim, Fed. Rep. of Germany

[21] Appl. No.: 921,671

[22] Filed: Oct. 21, 1986

[30] Foreign Application Priority Data

Oct. 23, 1985 [DE] Fed. Rep. of Germany ....... 3537686

[51] Int. Cl.⁴ .............................................. F01B 31/10
[52] U.S. Cl. ....................................... 92/106; 92/153; 92/154; 92/158; 92/160; 279/4; 91/420
[58] Field of Search ....................... 279/4; 92/106, 153, 92/154, 158, 160; 384/462, 467, 471, 473, 606, 163; 91/420, 46

[56] References Cited

U.S. PATENT DOCUMENTS 4,319,516  3/1982  Rohm .................................... 91/420

Primary Examiner—Robert E. Garrett
Assistant Examiner—Thomas Denion
Attorney, Agent, or Firm—Karl F. Ross; Herbert Dubno; Andrew Wilford

[57] ABSTRACT

A chuck actuator has a cylinder extending along an axis and having an axially extending stem whose outer surface is formed with a pair of central radially outwardly open and axially spaced intake ports, a piston axially displaceable in the cylinder and forming therein two compartments connected via respective passages connected to the intake ports, two axially spaced bearings on the stem, and a connector supported by the bearings on the stem. This connector normally is restrained against rotation relative to the axis and has an inner surface closely juxtaposed with and forming with the stem surface an interface. Respective radially inwardly open and axially spaced inner feed grooves open at the interface level with the respective intake ports. Two independent hydraulic fittings communicating with the inner feed grooves can pass pressurized liquid to the respective compartments. A pair of middle lubricating grooves immediately axially flanking the inner feed grooves and opening radially inward at the interface, are connected to a drain chamber below the axis by respective middle drain passages extending downward from the middle lubricating grooves to the drain chamber. A shunt passage carries liquid axially therebetween and respective lubricating passages carry liquid from the middle grooves to the bearings. Respective outer drain grooves open radially on the connector between each bearing and the respective middle groove, and are connected with the bearings by respective outer drain passages to the drain chamber.

11 Claims, 4 Drawing Sheets

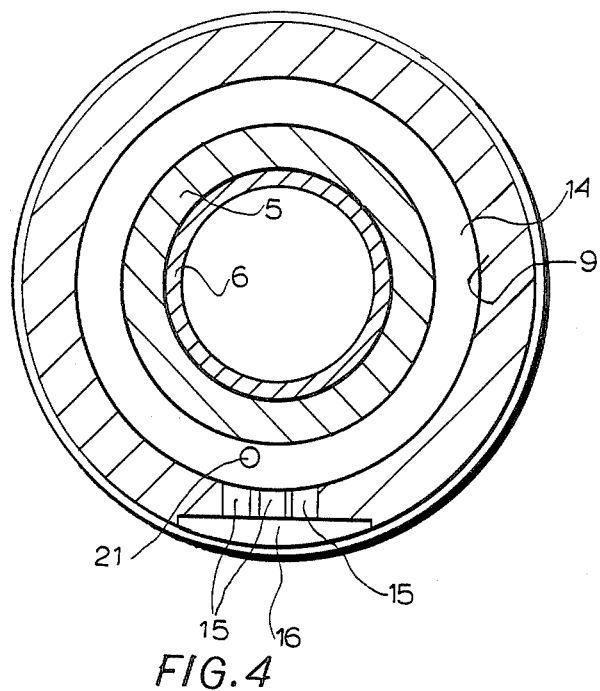
FIG. 4
FIG. 5
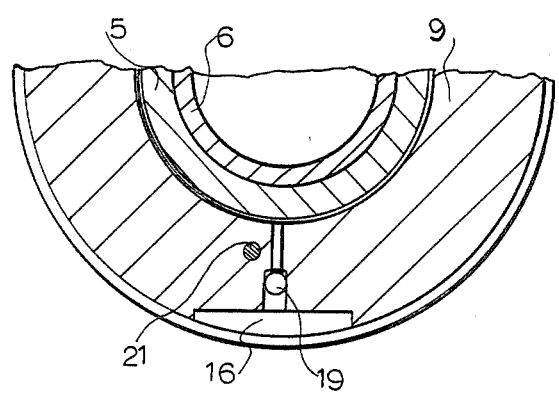

SELF-LUBRICATING HYDRAULIC ACTUATOR FOR POWER CHUCK

FIELD OF THE INVENTION

The present invention relates to a self-lubricating hydraulic actuator for a power chuck or the like. More particularly this invention concerns a device which sits on a lathe spindle and that opens and closes a power chuck connected to it, whether of the external or internal jaw type or of the internal mandrel type.

BACKGROUND OF THE INVENTION

A power chuck or mandrel such as described in my numerous earlier patents has a chuck or mandrel body centered on and rotatable about the axis of a headstock on which it is mounted. Normally jaws or similarly effective elements on the chuck body can be displaced radially by axial displacement of a central operating member. In a standard chuck this operating member may have a plurality of hooks with inclined faces that engage oppositely inclined faces of the jaws so that displacement of the hooks cams the jaws radially in or out depending on the axial displacement direction. In a power mandrel the operating member can be a piston which pressurizes the interior of an outwardly swellable sleeve that engages the inner surface of a tubular workpiece or of a bore in a workpiece or tool.

Such a chuck can be actuated by a device of the type described in my now abandoned U.S. patent application Ser. Nos. 580,460 and 580,461 both filed Feb. 15, 1984. This arrangement has a cylinder extending along an axis and a piston axially displaceable in the cylinder and forming therein two compartments. The cylinder has an axially backwardly extending stem also centered on the axis and formed with two respective passages each having one end opening into a respective one of the compartments and another end opening at a respective location on the stem, these locations being axially offset from each other. A connector rotatable about the axis on the stem is provided with respective fittings communicating with the locations which are normally constituted as radially outwardly open grooves into which the ends of the respective passages open. Bearings prevent the connector from moving axially on the stem. Fluid is fed under pressure alternately to the fittings to pressurize and depressurize the respective compartments and thereby urge the piston in respective axial directions in the cylinder. The cylinder is connected to a chuck body and the piston to a chuck-actuating member for fluid actuation of the member. A respective double check valve in each of the passages inhibits flow out of the respective compartment unless the other compartment is pressurized, so that neither compartment can drain unless the other compartment is pressurized.

The play between the outer surface of the stem and the inner surface of the connector is a few hundredths of millimeters and a tiny bit of leakage is permitted from the feed grooves along this interface to keep it and the support bearings lubricated. Thus liquid leaks along the joint to the two bearings, passes through them, and is collected in a sump or catchment formed in the bottom of the connection which itself does not rotate with the actuator.

In another known system small passages extend from the inlet passages in the connection to compartments adjacent the bearings, so the hydraulic fluid can feed thence directly to these bearings.

A main problem with either arrangement is that the path from whichever groove is pressurized to one bearing is much longer than the path from this pressurized groove to the other bearing. In addition an unpressurized groove will lie between the pressurized groove and its bearing at any time. Thus the flow will be in only one direction along the stem-connection interface. If the chuck or mandrel is frequently opened and closed there are no problems, but if it is held for long periods in one or the other position without change of actuation direction, there is a serious risk of the one end of the interface and the corresponding bearing drying out completely.

Furthermore at high rotation speeds the thin film filling the interface heats up considerably, principally because of the considerable shear it is subjected to between two closely spaced relatively moving surfaces. It therefore becomes ineffective as a coolant and lubricant. This problem can be partially solved by shortening the axial length of this interface to ensure considerable flow through it. When there is such substantial flow, however, at high speeds the fluid is ejected from the end of the unit where it is vaporized, creating a particular nuisance for the nearby operator and equipment.

OBJECTS OF THE INVENTION

It is therefore an object of the present invention to provide an improved actuator for a power chuck or the like.

Another object is the provision of such an actuator for a power chuck or the like which overcomes the above-given disadvantages, that is which is set up for excellent lubrication and cooling of the interface between the cylinder stem and the connector regardless of actuation direction or operation speed.

SUMMARY OF THE INVENTION

A chuck actuator according to the invention has a cylinder extending along an axis and having an axially extending stem having an outer stem surface and formed on this surface with a pair of central radially outwardly open and axially spaced intake ports, a piston axially displaceable in the cylinder and forming therein two compartments connected via respective passages to the intake ports, two axially spaced bearings on the stem, and a connector supported by the bearings for angular but not radial motion on the stem. This connector normally is restrained against rotation relative to the axis and has an inner surface closely juxtaposed with and forming with the stem surface an interface centered on the axis. Respective radially inwardly open and axially spaced inner feed grooves open at the interface level with the respective intake ports. Two independent hydraulic fittings communicating with the inner feed grooves can pass pressurized liquid to the respective compartments. A pair of middle lubricating grooves immediately axially flanking the inner feed grooves and opening radially inward at the interface are connected to a drain chamber below the axis by respective middle drain passages extending downward from the middle lubricating grooves to the drain chamber. A shunt passage extending axially between the middle lubricating grooves carries liquid axially therebetween and respective outer drain passages extending axially between the middle grooves and the respective bearings carry liquid from the middle grooves to the bearings. Respective outer drain grooves open radially on one of the surfaces between each bearing and the respective middle groove, and are connected with the bearings by respective outer drain passages independent of the middle passages to the drain chamber.

The shunt passages ensure that both of the middle grooves will be at substantially the same fullness or pressure, and the inner drain passages will keep this pressure low even when the system is operating at high speed and at a high pressure so that there is a lot of leakage along the interface. The lubrication is accurately dosed through the calibrated lubricating passages, which are of much smaller flow cross section than the drain passages, for proper lubrication of the bearings regardless of other operating circumstances.

According to another feature of this invention the middle and outer drain passages lie in an upright plane and each have an upper end in the respective groove and a lower end in the chamber. In addition the connector is provided with respective bores extending along the lubricating passages and with respective bolts fitted in the bores and formed with respective longitudinal grooves forming the respective lubricating passages. Furthermore the inner surface of the connector is of such a diameter between the outer grooves and the bearings that at this region the interface is radially wider than between the outer grooves.

The outer drain passages of this invention are each Y-shaped, with a central leg emptying into the drain chamber, one arm connected to the respective bearing, and another arm connected to the respective outer drain groove.

In accordance with another feature of this invention two respective rings axially flank the bearings and each have an inner periphery gripped tightly around the stem for joint rotation therewith and an outer periphery of greater diameter than the respective bearing. The stem and connector are both stepped out immediately axially outside each ring to form immediately adjacent each ring a shoulder bearing axially inward against the respective ring and itself forming with the connector an outer seal region lying radially between the inner and outer peripheries of the respective ring. Each shoulder has an outer edge formed with an axially inwardly open groove and with a radially upwardly open pocket communicating with the respective outer drain passage.

Furthermore in this arrangement the connector is formed at each outer interface with a radially inwardly open catchment groove communicating with the respective pocket and the stem is formed at each interface with a radially outwardly open interception groove aligned with the respective catchment groove. Each interception groove has an outer flank generally perpendicular to the axis and centered on the respective catchment groove, and an inner flank inclined to the axis and between the respective outer flank and the respective ring.

The outer drain grooves are either formed in the surface of the connector or that of the stem.

DESCRIPTION OF THE DRAWING

The above and other features and advantages of the invention will become more readily apparent from the following, reference being made to the accompanying drawing in which:

FIGS. 3, 4, 5, and 6 are cross sections taken along respective lines III—III, IV—IV, V—V, and VI—VI of FIG. 1, some elements being omitted for clarity of view.

SPECIFIC DESCRIPTION

Figure 1:
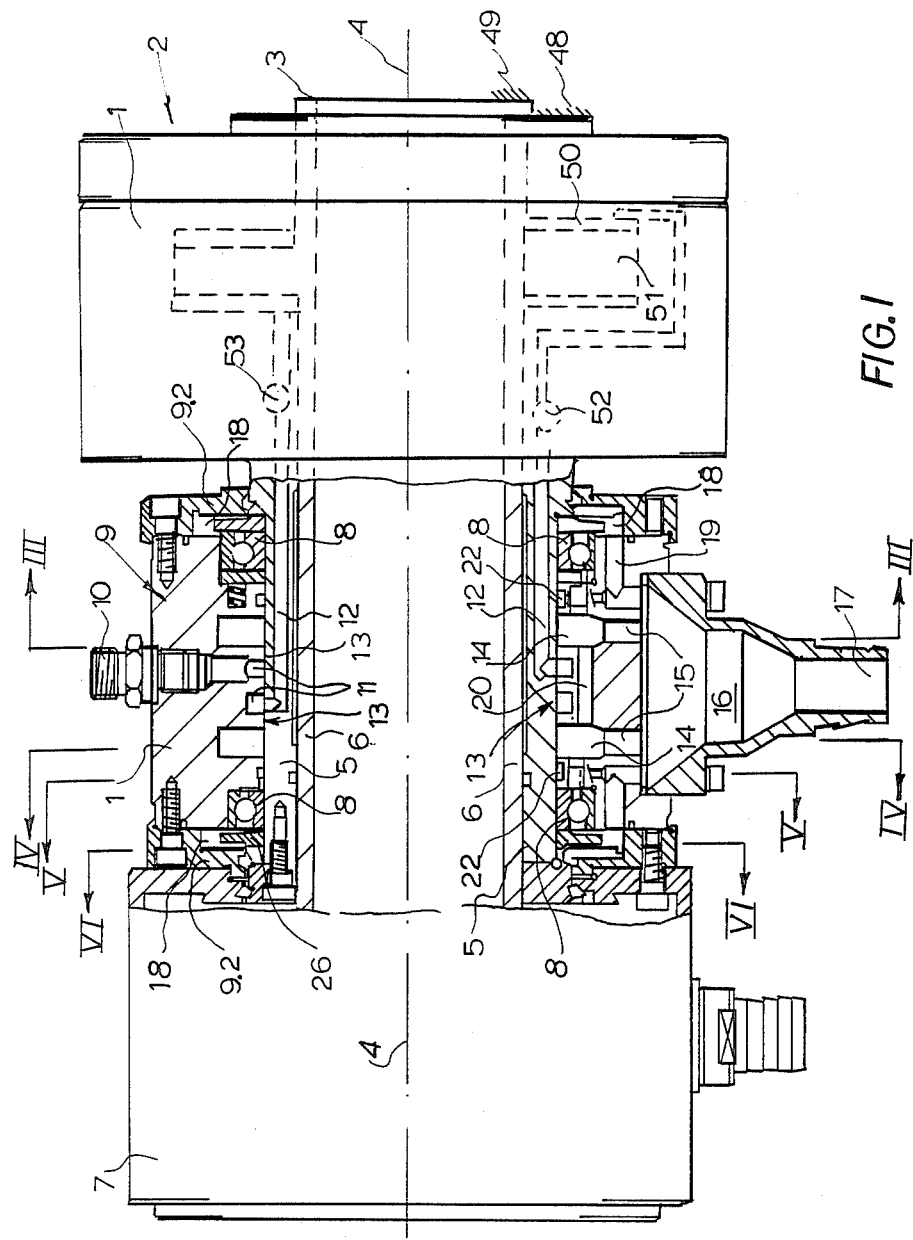
FIG. 1 is a side view partly in axial section through the actuator according to the present invention.

As seen in FIG. 1 a chuck actuator according to the invention has a main housing 1 of cylindrical shape centered on a normally horizontal axis 4 corresponding to the rotation axis of the tool being controlled. Here the housing 1 has a front face 2 against which the body shown schematically at 48 of a chuck is bolted, while the actuating member of this chuck, which itself is shown schematically at 49, is secured to the front end 3 of a cylindrically tubular piston rod 6 extending coaxially through the housing 1. This piston rod 6 carries in a cylinder 50 in the front end of the housing 1 a piston 51 that can be pressurized on either axial face via standard double check valves 52 and 53 to move axially in either direction and thereby open or close the chuck or other tool- or workpiece-holding implement 48 actuated by the system of this invention. All this structure is standard and is described in great detail in my above-cited patent applications.

Figure 2:
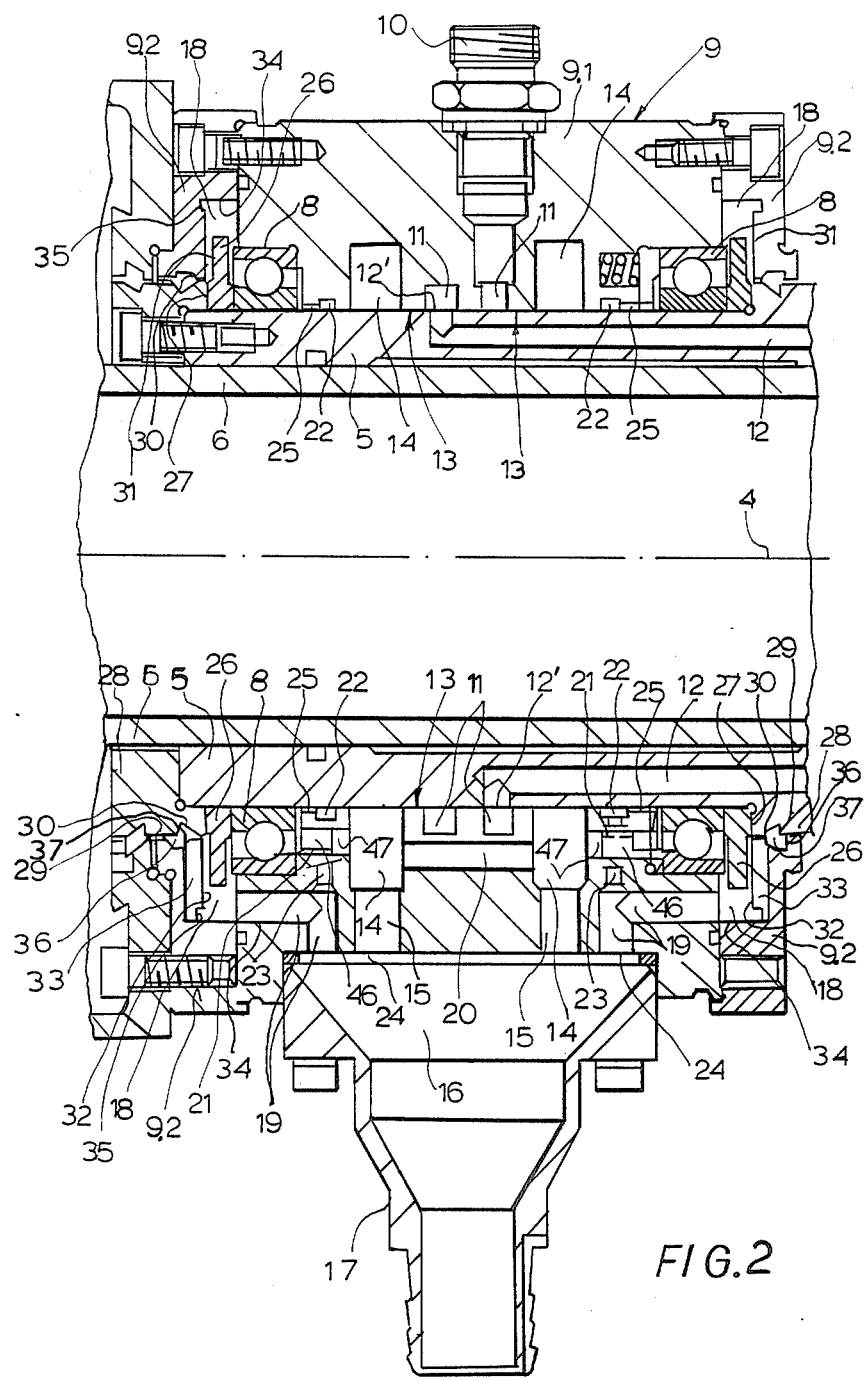
FIG. 2 is a detail view of the central sectioned region of the view of FIG. 1.

The housing 1 has a cylindrical stem 5 centered on the axis 4 and extending axially back from the chuck 48. A connector 9 is supported on this stem 5 by two axially spaced roller bearings 8 and has a body 9.1 provided with two connectors 10 (only one visible in the drawing) that allow the front and back compartments of the chamber 50 to be pressurized and depressurized alternately via the respective valves 52 and 53. This body 9.1 has opposite end plates 9.2 one of which carries a monitoring unit 7 that magnetically detects the axial position of the piston shaft 6 in the housing 1. The bearings 8 are of the radial- and axial-thrust ball type and the outer race of the right-hand bearing as seen in FIG. 2 is spring-biased axially outward to take up any play and thereby fix the connector 9 radially and axially relative to the axis 4 on the stem 5. The connector 9 and unit 7 are relatively nonrotatable about the axis 4 whereas the cylinder housing 1 and piston 51 rotate jointly with the tool operated by the actuator of this invention.

To this end the body 9.1 is formed with two axially spaced and radially inwardly open grooves 11 connected to the fittings 10 and the stem 5 is formed with two respective passages 12 opening at ports 12' at the grooves 11 and connected via the valves 52 and 53 to the compartments of the chamber 50. The body 9.1 is only a tiny bit larger than the stem 5 so as to form a cylindrical interface 13 centered on the axis 4 and constituting an interference seal between the grooves 11.

Flanking the feed grooves 11 are a pair of radially inwardly open lubricating grooves 14 formed in the connector body 9.1 and connected in turn via radially downwardly extending passages 15 (see also FIG. 4) to a drain or collection funnel 16 connected to a fitting 17 in turn connected to the sump of the hydraulic system. Most of the oil that leaks from the central grooves 11 along the interface flows into these middle grooves 14 and thence drains out via the connection 17. Similarly flanking the middle grooves 14 and the bearings 8 are outer drain grooves 18 connected via respective passages 19 to the drain 16 so that some of the oil that is directed as described below to the grooves 18 from these bearings 8 can flow back to the drain 16. The drain passages 19 are wholly separate from the drain passages 15, opening offset therefrom into the drain 16.

Figure 3:
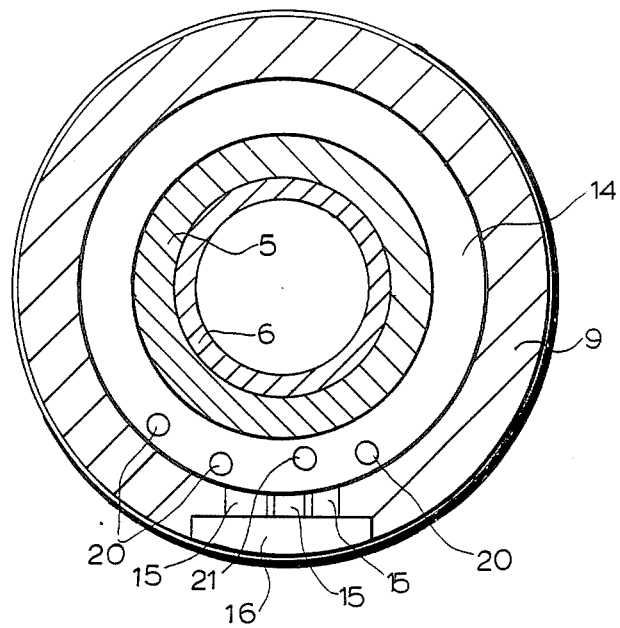
Figure 6:
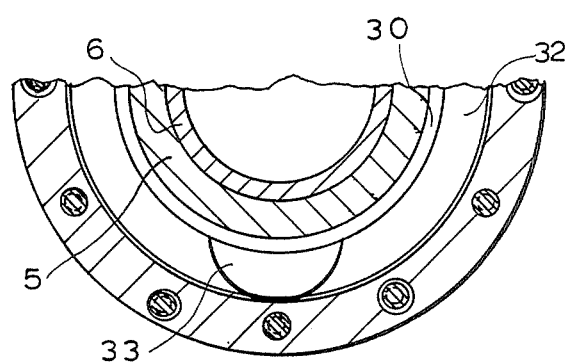

As seen in FIGS. 3 and 4 the middle lubricating grooves 14 are connected axially to each other by a plurality of axially extending shunt passages 20 and are connected via smaller-diameter throttling passages 21 to the respective bearings 8, the passages 21 being radially inside the passages 20 and being formed by grooves in bolts or pins 46 fitted into axial bores 47 in the connector body 9.1. The shunt passages 20 are somewhat far inward radially so that they catch a good portion of the flow into the grooves 14 before it can escape to the drain 16, thereby ensuring that both grooves 14 will be full to the same extent, regardless of which of the grooves 11 is pressurized.

Between each middle groove 14 and the respective bearing 8, the connector body 9.1 is formed with a small radially inwardly open groove 22 connected via respective downwardly extending and fairly small drain passages 23 to the full-size drain passages 19 of the outer drain grooves 18. Axially outward from these intercepting grooves 22 the stem 5 has a region 25 of larger diameter so that the grooves 22 will even catch oil draining axially inward from the bearings 8. The grooves 22 and widened region 25 could also be formed in the stem 5 with no appreciable change in function. The passages 19 and 23 of the outer grooves 22 and the drain grooves 18 open at a common location 24 into the drain 16 and are all coplanar. Since in the use position the fitting 17 points straight down, so that the drain passages 15, 19, and 23 all are vertical, gravity alone will ensure efficient draining of the grooves.

The resistance to flow in the throttling passages 21 is in any case greater than the resistance to flow through the bearings, 8, the grooves 18, and the drain passages 19 so that the oil in the grooves 18 is under no appreciable superatmospheric pressure.

As a result the amount of lubrication for the bearings 8 will be determined essentially solely by the level of pressurization of either of the grooves 11. Leakage along the interface 13 from either of the grooves 11 will reach the respective lubrication groove 14 relatively quickly and will thence be shared via the shunt passages 20 with the other groove 14, so that both grooves 14 will be at substantially the same pressure or fullness. Thence the hydraulic fluid flows out to the respective bearings 8 via the feed passages 21. The relative operational speeds of the chuck stem 5 and the connector 9 are largely irrelevant to this uniform lubrication since the length of the path along the interface 13 from either of its grooves 11 to the respective grooves 14 is quite short.

To prevent the oil lubricating the bearings 8 from leaking outside the chuck actuator according to this invention, rings 26 are provided axially braced between the axial outer face of the inner race of each bearing 8 and an axially inwardly directed surface 27 formed by a shoulder 28 formed by the stem 5 or an element attached thereto. These rings 26 are snapped onto the stem 5 to rotate therewith and have radially outer peripheries that extend radially outward past the outer races of the respective bearings 8. The plates 9.2 of the connector body 9 have axially inwardly directed surfaces 32 spaced axially outside the respective rings and generally in line with the respective shoulder surfaces 27. The rings 26 are tapered or of reduced axial dimension on their outer peripheries to form respective annular spaces 31 with the surfaces 32.

The outer surface 29 of the shoulder 28 forms with the inner periphery of the respective end plate 9.2 an annular seal gap 30 that lies radially within the outer periphery of the respective ring 26. In addition the radially inwardly open collection grooves 18 have axially inwardly open pockets 33 that extend radially downward from the gap 30 to the base 34 of the respective groove 18, at which level the respective drain passages 19 open. Axially inwardly directed grooves 35 level with the bases 34 are formed in the axial and radial outer limits of the chambers 18, these grooves 35 traversing the respective pockets 33. Thus any hydraulic liquid getting past one of the bearings 8 will be intercepted by the respective ring 26 and, if the stem 5 with the rings 26 is turning inside the connector 9, will be centrifugally spun off onto the floor 34 of the respective groove 18 and thence drain out via the respective passage 19. If the stem 5 is not rotating in the connector 9, the fluid intercepted by one of the rings 26 will simply drip down in the groove 18 and run out via the passage 19.

In addition the radially inwardly directed surfaces of each of the stationary end plates 9.2 is formed axially immediately outside the respective gaps 30 with a radially inwardly open catch groove 36 that opens axially inward into the pocket 33 at the bottom of the connector 9. The facing radially outwardly directed surfaces 29 of the shoulders 28 are formed with radially outwardly open interception grooves 37 each having an axially outer flank that is perpendicular to the axis 4 and centered in the respective groove 36. Thus any liquid seeping past the gaps 30 on the connector 9 will be caught by the respective grooves 36 and drain out, and any seeping outward past the gap 30 on the shoulders 28 of the stem 5 will be intercepted by the respective grooves 37 and spun out into the grooves 36.

I claim:
1. A chuck actuator comprising:
a cylinder extending along an axis and having an axially extending stem having an outer stem surface and formed on this surface with a pair of central radially outwardly open and axially spaced intake ports;
a piston axially displaceable in the cylinder and forming therein two compartments, the stem being formed with respective passages connected between the compartments and the respective intake ports;
two axially spaced bearings on the stem axially flanking the ports;
a connector supported by the bearings for angular but not radial motion on the stem, the connector normally being restrained against rotation relative to the axis, the connector being formed with
an inner surface closely juxtaposed with and forming with the stem surface an interface centered on the axis,
respective radially inwardly open and axially spaced inner feed grooves opening at the interface level with the respective intake ports, the connector having two independent hydraulic fittings communicating with the inner feed grooves, whereby, when either of the fittings is pressurized with a hydraulic liquid, the respective compartment is pressurized via the respective intake port and feed groove and some of the hydraulic liquid seeps axially along the interface, a pair of middle lubricating grooves immediately axially flanking the inner feed grooves and opening radially inward at the interface, a drain chamber below the axis, respective middle drain passages extending downward from the middle lubricating grooves to the drain chamber, a plurality of angularly spaced shunt passages in addition to the middle drain passages, angularly spaced on the connector, and extending axially between the middle lubricating grooves for carrying liquid axially therebetween, a respective lubriating passage in addition to and in indirect fluid communication with the shunt passages and middle drain passages extending axially between a respective one of the middle grooves and the respective bearing for carrying liquid from the middle grooves to the bearings, respective outer drain grooves open radially on one of the surfaces between each bearing and the respective middle groove, and respective outer drain passages in addition to and in direct fluid communication with the middle passages and extending between the outer drain grooves, the bearings, and the drain chamber for conducting liquid directly from the outer drain grooves and bearings to the drain chamber.

2. The chuck actuator defined in claim 1 wherein the middle and outer drain passages lie in an upright plane, each having an upper end in the respective groove and a lower end in the chamber.

3. The chuck actuator defined in claim 1 wherein the connector is provided with respective bores extending along the lubricating passages and with respective bolts fitted in the bores and formed with respective longitudinal grooves forming the respective lubricating passages.

4. The chuck actuator defined in claim 1 wherein the inner surface of the connector is of such a diameter between the outer grooves and the bearings that at this region the interface is radially wider than between the outer grooves.

5. The chuck actuator defined in claim 1 wherein the outer drain passages are Y-shaped, each with a central leg emptying into the drain chamber, one arm connected to the respective bearing, and another arm connected to the respective outer drain groove.

6. The chuck actuator defined in claim 1, further comprising
two respective rings axially flanking the bearings and each having an inner periphery gripped tightly around the stem for joint rotation therewith and an outer periphery of greater diameter than the respective bearing.

7. A chuck actuator comprising:
a cylinder extending along an axis and having an axially extending stem having an outer stem surface and formed on this surface with a pair of central radially outwardly open and axially spaced intake ports;

a piston axially displaceable in the cylinder and forming therein two compartments, the stem being formed with respective passages connected between the compartments and the respective intake ports;

two axially spaced bearings on the stem;

a connector supported by the bearings for angular but not radial motion on the stem, the connector normally being restrained against rotation relative to the axis, the connector being formed with an inner surface closely juxtaposed with and forming with the stem surface an interface centered on the axis, respective radially inwardly open and axially spaced inner feed grooves opening at the interface level with the respective intake ports, the connector having two independent hydraulic fittings communicating with the inner feed grooves, whereby, when either of the fittings is pressurized with a hydraulic liquid, the respective compartment is pressurized via the respective intake port and feed groove and some of the hydraulic liquid seeps axially along the interface, a pair of middle lubricating grooves immediately axially flanking the inner feed grooves and opening radially inward at the interface, a drain chamber below the axis, respective middle drain passages extending downward from the middle lubricating grooves to the drain chamber, a shunt passage extending axially between the middle lubricating grooves for carrying liquid axially therebetween, respective lubricating passages extending axially between the middle grooves and the respective bearings for carrying liquid from the middle grooves to the bearings, respective outer drain grooves open radially on one of the surfaces between each bearing and the respective middle groove, and respective outer drain passages in addition to and in indirect fluid communication with the middle passages and extending between the outer drain grooves, the bearings, and the drain chamber for conducting liquid from the outer drain grooves and bearings to the drain chamber; and two respective rings axially flanking the bearings and each having an inner periphery gripped tightly around the stem for joint rotation therewith and an outer periphery of greater diameter than the respective bearing, the stem and connector both being stepped out immediately axially outside each ring to form immediately adjacent each ring a shoulder bearing axially inward against the respective ring and itself forming with the connector an outer seal region lying radially between the inner and outer peripheries of the respective ring.

8. The chuck actuator defined in claim 7 wherein each shoulder has an outer edge formed with an axially inwardly open groove and with a radially upwardly open pocket communicating with the respective outer drain passage.

9. The chuck actuator defined in claim 8 wherein the connector is formed at each outer interface with a radially inwardly open catchment groove communicating with the respective pocket and the stem is formed at each interface with a radially outwardly open interception groove aligned with the respective catchment groove.

10. The chuck actuator defined in claim 9 wherein each interception groove has an outer flank generally perpendicular to the axis and centered on the respective catchment groove, and an inner flank inclined to the axis and between the respective outer flank and the respective ring.

11. The chuck actuator defined in claim 1 wherein the outer drain grooves are formed in the surface of the connector.

* * * * *